US010037367B2

(12) United States Patent
Kiciman et al.

(10) Patent No.: US 10,037,367 B2
(45) Date of Patent: Jul. 31, 2018

(54) MODELING ACTIONS, CONSEQUENCES AND GOAL ACHIEVEMENT FROM SOCIAL MEDIA AND OTHER DIGITAL TRACES

(71) Applicant: MICROSOFT TECHNOLOGY LICENSING, LLC, Redmond, WA (US)

(72) Inventors: Emre Mehmet Kiciman, Seattle, WA (US); Paul Nathan Bennett, Redmond, WA (US); Jaime Brooks Teevan, Bellevue, WA (US); Susan Theresa Dumais, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 451 days.

(21) Appl. No.: 14/570,520

(22) Filed: Dec. 15, 2014

(65) Prior Publication Data
US 2016/0171063 A1 Jun. 16, 2016

(51) Int. Cl.
G06F 17/30 (2006.01)
G06Q 30/02 (2012.01)
G06Q 50/00 (2012.01)
(52) U.S. Cl.
CPC .. *G06F 17/30563* (2013.01); *G06F 17/30294* (2013.01); *G06F 17/30551* (2013.01);
(Continued)
(58) Field of Classification Search
CPC ......... G06F 17/30563; G06F 17/30294; G06F 17/30551; G06Q 30/0255; G06Q 50/01; G06Q 30/02
(Continued)

(56) References Cited

U.S. PATENT DOCUMENTS 8,230,062 B2 7/2012 Newton
8,332,767 B1 * 12/2012 Beil .................. G06F 17/30265
715/230
(Continued)

FOREIGN PATENT DOCUMENTS

WO 2010048172 A1 4/2010
WO 2012088611 8/2012

OTHER PUBLICATIONS

Nguyen et al., "Event extraction using behaviors of sentiment signals and burst structure in social media" published 2012, Springer, pp. 270-304. Download: http://link.springer.com/article/10.1007/s10115-012-0494-9.*

(Continued)

*Primary Examiner* — Hares Jami
(74) *Attorney, Agent, or Firm* — Shook, Hardy & Bacon L.L.P.

(57) ABSTRACT

Systems, methods, and computer storage media are provided for analyzing a large amount of social media data from a large population of social media users and constructing correlational data models between one or more events that occur within each user's timeline. Social media posts directed to personal experiences of a large number of social media users are extracted. Event timelines are generated for each of the social media users, based on their personal experiences. The event timelines are analyzed with a particular event of interest to measure correlations between events occurring within the timelines and the particular event of interest. Using the measured correlations, a correlational data model is thereby constructed. The correlational data model may be used for application to decision-making calculations by one or more systems in an active or passive manner.

10 Claims, 4 Drawing Sheets

(52) U.S. Cl.
CPC ......... *G06Q 30/02* (2013.01); *G06Q 30/0255* (2013.01); *G06Q 50/01* (2013.01)

(58) Field of Classification Search
USPC .................. 707/602, 790, 802, 803, 804
See application file for complete search history.

(56) References Cited

U.S. PATENT DOCUMENTS

| | | | |
|---|---|---|---|
| 8,676,722 | B2 | 3/2014 | Sweeney et al. |
| 8,775,247 | B2 | 7/2014 | Kendall et al. |
| 9,553,922 | B1* | 1/2017 | Guarraci ............ H04N 21/4788 |
| 2010/0088130 | A1 | 4/2010 | Bonchi et al. |
| 2010/0235307 | A1 | 9/2010 | Sweeney |
| 2010/0268830 | A1 | 10/2010 | McKee et al. |
| 2011/0179114 | A1 | 7/2011 | Dilip et al. |
| 2012/0001919 | A1 | 1/2012 | Lumer |
| 2012/0089616 | A1 | 4/2012 | Sa'adon |
| 2012/0259882 | A1 | 10/2012 | Thakur et al. |
| 2013/0035986 | A1 | 2/2013 | Kursar et al. |
| 2013/0124437 | A1 | 5/2013 | Pennacchiotti et al. |
| 2013/0179440 | A1 | 7/2013 | Gordon |
| 2014/0074844 | A1 | 3/2014 | Subramanian et al. |
| 2014/0279998 | A1 | 9/2014 | Blumenfeld et al. |
| 2014/0280537 | A1* | 9/2014 | Pridmore ................ H04L 51/32 709/204 |

OTHER PUBLICATIONS

"International Search Report and Written Opinion Issued in PCT Application No. PCT/US2015/064354", dated Feb. 25, 2016, 12 pages.

Konstas et al., "On Social Networks and Collaborative Recommendation", Published Jul. 19, 2009, In Proceedings of the 32nd International ACM SIGIR Conference on Research and Development in Information Retrieval, 8 pages. http://eprints.gla.ac.uk/5985/2/sigirfp468-konstas-ENLIGHTEN.pdf?origin=publication_detail.

Strohmaier, Markus, "Purpose Tagging: Capturing User Intent to Assist Goal-Oriented Social Search", Published Oct. 30, 2008, In Proceedings of ACM Workshop on Search in Social Media, 8 pages. http://www.markusstrohmaier.info/documents/2008_SSM_Purpose-Tagging.pdf.

Banko et al., "Open Information Extraction for the Web", PUblished Jan. 6, 2007, In Proceedings of 20th International Joint Conference on Artificial Intelligence, 7 pages, http://turing.cs.washington.edu/papers/banko-thesis.pdf.

Bordes et al., "Joint Learning of Words and Meaning Representations for Open-Text Semantic Parsing", PUblished Apr. 21, 2012, In Proceedings of 15th International Conference on Artificial Intelligence and Statistics, vol. 22, 9 pages, http://jmlr.org/proceedings/papers/v22/bordes12/bordes12.pdf.

Bouttou, Leon, From Machine Learning to Machine Reasoning:, Published Feb. 2014, In Machine Learning, vol. 94, Issue 2, 15 pages http://citeseerx.ist.psu.edu/viewdoc/download;jsessionid=0C0F11F9C5FD559FE55F4EBE3A35E7D7?doi=10.1.1.418.6907&rep=rep1&type=pdf.

Diaz et al., "Online and Social Media Data as a Flawed Continuous Panel Survey", Retrieved Oct. 29, 2012, 1 page. http://research.microsoft.com/flawedsurvey/.

Fikes et al., "STRIPS: A New Approach to the Application of Theorem Proving to Problem Solving", PUblished Sep. 1971, In Proceedings of the 2nd International Joint Conference on Artificial Intelligence, 20 pages. http://ai.stanford.edu/~nilsson/OnlinePubs-Nils/PublishedPapers/strips.pdf.

Gunawardana et al., "A Model for Temporal Dependencies in Event Streams", Published Dec. 2011, In Proceedings of the Neural Information Processing Systems, 9 pages. http://papers.nips.cc/paper/4395-a-model-for-temporal-dependencies-in-event-streams.pdf.

Jin et al., "Entity Linking at the Tail: Sparse Signals, Unknown Entities, and Phrase Models", Published Feb. 24, 2014, In Proceedings of the 7th ACM International Conference on Web Search and Data Mining, 10 pages. http://research.microsoft.com/pubs/205509/wsdm180-jin.pdf.

Kiciman, Emre, "OMG, I have to Tweet that! A Study of Factors that Influence Tweet Rates", Published Jun. 4, 2012, In Proceedings of the Sixth International AAAI Conference on Weblogs and Social Media, 8 pages. http://research.microsoft.com/pubs/159603/ICWSM12-031.pdf.

Ghallab et al., "PDDL—Planning Domain Definition Language", Published Oct. 1998, In Technical Report, 27 pages. http://homepages.inf.ed.ac.uk/mfourman/tools/propplan/pddl.pdf.

Mikolov et al., "Distributed Representations of Words and Phrases and their Compositionality", Published Dec. 6, 2013, In Proceedings of Neural Information Processing Systems Foundation, 9 pages. http://papers.nips.cc/paper/5021-distributed-representations-of-words-and-phrases-and-their-compositionality.pdf.

Mislove et al., "Understanding the Demographics of Twitter Users", Published Jul. 17, 2011, In Proceedings Fifth International AAAI Conference on Weblogs and Social Media, 4 pages. http://www.ccs.neu.edu/home/amislove/publications/Twitter-ICWSM.pdf.

Pearl, Judea, "Causality: Models, Reasoning and Inference", Published Mar. 2000, In Proceedings of Cambridge University Press, 11 pages. http://bayes.cs.ucla.edu/BOOK-2K/neuberg-review.pdf.

Pennington et al., "GloVe: Global Vectors for Word Representation", Published Oct. 25, 2014, In Proceedings Conference on Empirical Methods in Natural Language Processing, 12 pages. http://nlp.stanford.edu/pubs/glove.pdf.

Robins et al., "On the Impossibility of Inferring Causation from Association without Background Knowledge", Retrieved Oct. 29, 2014, In Proceedings of Computation, Causation, and Discovery, 17 pages. http://www.biostat.harvard.edu/robins/impossibility.pdf.

Rosenbaum et al., "The Central Role of the Propensity Score in Observational Studies for Causal Effects", Published Apr. 1983, In Proceedings Biometrika, vol. 70, No. 1, 16 pages. http://faculty.smu.edu/Millimet/classes/eco7377/papers/rosenbaum%20rubin%2083a.pdf.

Spirtes et al., "An Algorithm for Fast Recovery of Sparse Causal Graphs", Retrieved Oct. 29, 2014, In Proceedings Information Science & Library Science, 6 pages. http://www.hss.cm.edu/philosophy/glymour-pdfs/algorithmsparse.pdf Turney et al., "From Frequency to Meaning: Vector Space Models of Semantics", Published Feb. 2010, In Journal of Artificial Intelligence Research, vol. 37, 48 pages. http://www.aaai.org/Papers/JAIR/Vol37/JAIR-3705.pdf.

* cited by examiner

MODELING ACTIONS, CONSEQUENCES AND GOAL ACHIEVEMENT FROM SOCIAL MEDIA AND OTHER DIGITAL TRACES

BACKGROUND OF THE INVENTION

Technology-assisted decision making is becoming more commonplace in the lives of modern society. Users rely on technologies to research product and/or service reviews on-demand, harnessing data from sources such as social media, blogs, mobile applications, etc. These existing technologies may provide very specific empirical data to users for making better-informed decisions. Many of these technologies, however, are limited to provide information to the user when the users know exactly what they are looking for. Social media, particularly, serves as an enormous resource of publicly available data, whereby users share their personal experiences via social media posts. The data gathered from social media may cover a broad scope of personal experiences related to a particular event, action, goal, product, service, or other subject of interest. Users, however, are generally limited to parsing social media data using simple search queries that narrow the scope of data available for review based on keywords of interest.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to analyzing social media experiential data to influence decision-making calculations. Experiential social media posts for a plurality of social media users are extracted. Event timelines are generated for each social media user. Based on a particular event of interest, a correlational data model is constructed for the social media users having experienced the particular event. The correlational data model is applied to a decision-making calculation corresponding to the particular event of interest.

BRIEF DESCRIPTION OF THE DRAWING

The present invention is illustrated by way of example and not limitation in the accompanying figures in which like reference numerals indicate similar elements and in which.

DETAILED DESCRIPTION OF THE INVENTION

Figure 1:
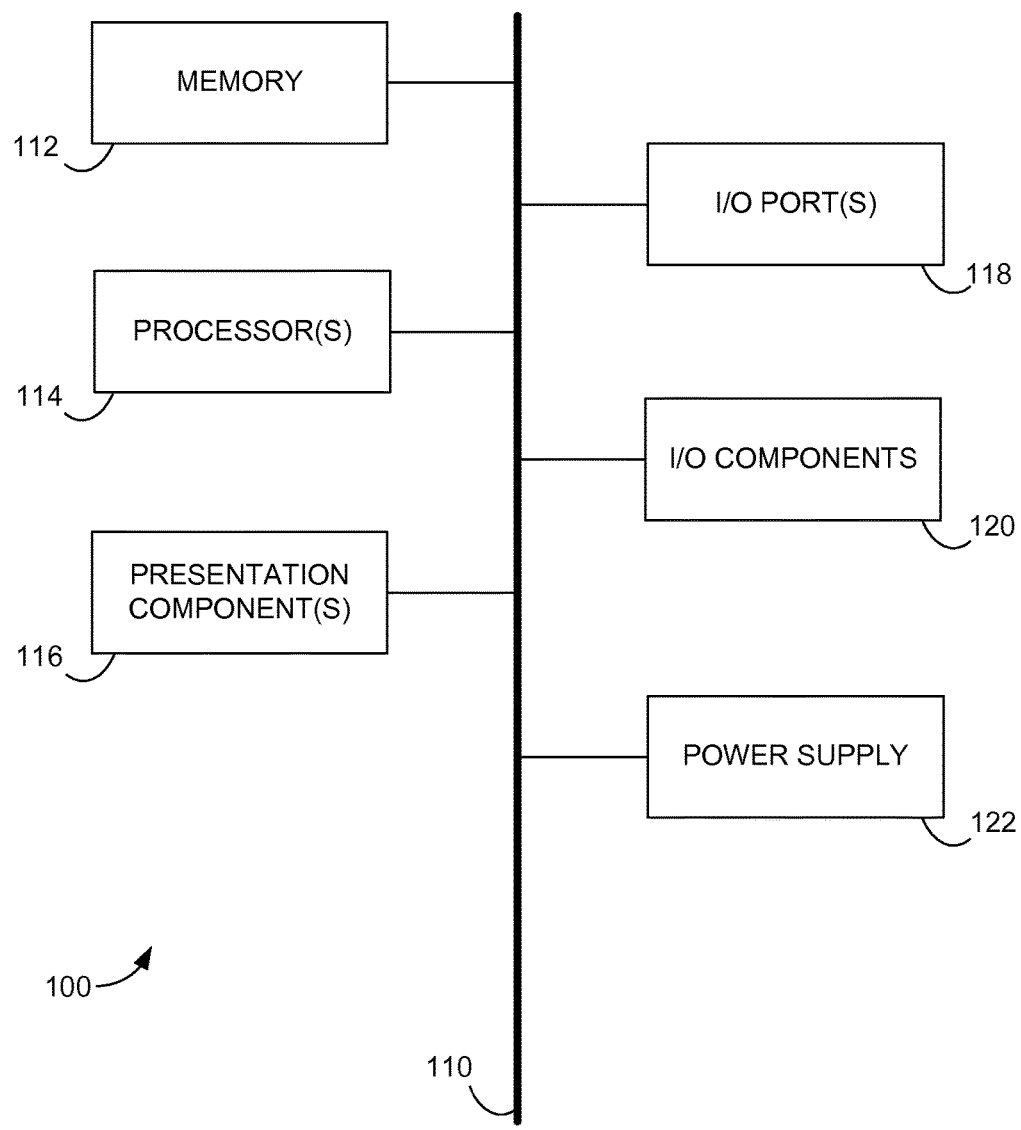
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

To assist individuals with their decision-making, some technologies have been developed that provide empirical data to curious individuals based on user opinions and reviews. Review sites, blogs, product and service webpages, etc., are typically referenced by individuals when seeking decision-making assistance based on others' experiences with a particular event or item. Generally speaking, these resources are limited to the specific event, service, or item itself. Social media, however, is a continuously increasing resource comprising an enormous amount of uncategorized, user-specific, experiential data for every day experiences, actions taken, and consequences resulting therefrom. Many social media users typically publish or "post" first-hand experiences nearly every day, sometimes multiple times each day. Typically, these social media users continue to post ongoing, seemingly related or unrelated events to a particular event or action previously or to eventually be taken.

Embodiments of the present invention are generally directed to analyzing a large amount of social media data from a large population of social media users and constructing correlational data models between one or more events that occur within each user's timelines. By analyzing first-person events experienced by a single user and correlating events to other events that occur in that single person's life, as posted on social media, such data collected over a large sample of social media users can be used to construct decision-making models used for assisting a user potentially interested in making similar decisions or experiencing similar experiences. In other words, social media experiential data can be used to assist one to make better decisions and take better actions to reach their goals by harnessing the experiential data published by hundreds of millions of social media users posting about the actions they've taken and consequences experienced in their lives thereafter.

Accordingly, in one aspect, an embodiment of the present invention is directed to a non-transitory computer storage medium storing computer-usable instructions that, when used by one or more computing devices, cause the one or more computing devices to perform operations. The operations include extracting a plurality of experiential social media posts associated to a plurality of social media users. The operations further include generating a plurality of event timelines based on at least the metadata of the plurality of experiential social media posts, each event timeline being unique to each of the plurality of social media users. The operations also include constructing a correlational data model by measuring correlations between a particular event of interest and at least some of the plurality of experiential social media posts in at least some of the plurality of event timelines. The operations further include applying the correlational data model to at least one decision-making calculation corresponding to the particular event of interest.

In another embodiment of the invention, an aspect is directed to a computer-implemented method. The method includes extracting a plurality of experiential social media posts associated to a plurality of social media users. The method also includes generating a plurality of event timelines based on at least the metadata of the plurality of experiential social media posts, each event timeline being unique to each of the plurality of social media users. The method also includes constructing, using at least one processor, a correlational data model by measuring correlations between a particular event of interest and at least some of the plurality of experiential social media posts in at least some of the plurality of event timelines. The method further includes applying the correlational data model to at least one decision-making calculation corresponding to the particular event of interest.

A further embodiment is directed to a computerized system comprising one or more processors; and one or more computer storage media storing computer-useable instructions that, when used by the one or more processors, cause the one or more processors to: extract a plurality of experiential social media posts associated to a plurality of social media users; generate a plurality of event timelines based on at least the metadata and some content of the plurality of experiential social media posts, each event timeline being unique to each of the plurality of social media users, and wherein the content includes at least some temporal description; construct, using the one or more processors, a correlational data model by measuring correlations between a particular event of interest and at least some of the plurality of experiential social media posts in at least some of the plurality of event timelines, wherein the correlations measured includes identifying a positive and/or negative valence of the at least some of the plurality of experiential social media posts to the particular event of interest; and apply the correlational data model to at least one decision-making calculation corresponding to the particular event of interest.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, data centers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures (i.e., motion or movements associated with a user's hand or hands or other parts of the user's body), voice, or other physiological inputs generated by a user. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with one or more touch digitizers and/or depth cameras, such as, stereoscopic camera systems, infrared camera systems, RGB camera systems, and combinations of these for direct and/or hover gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 2:
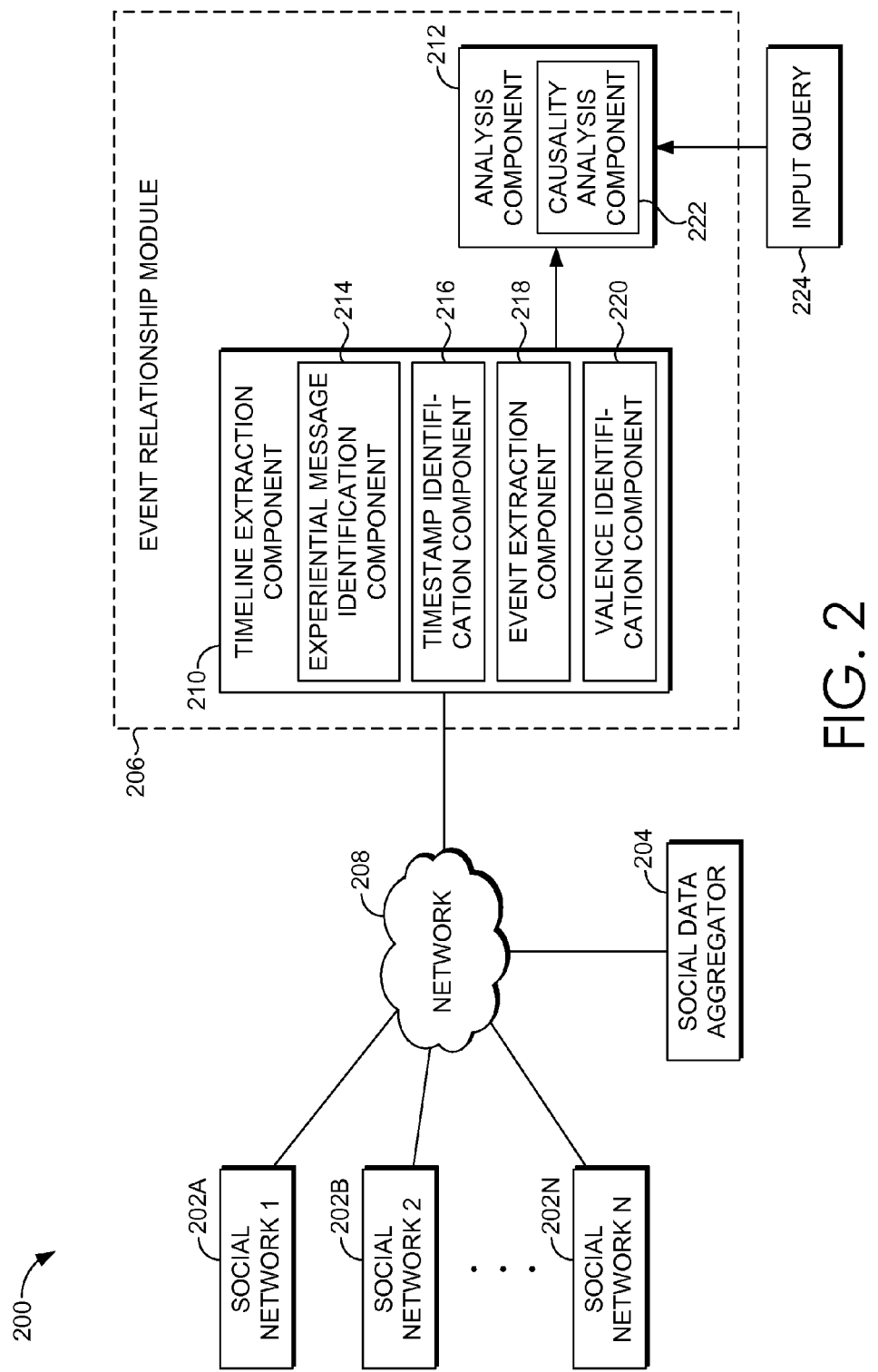
FIG. 2 is a block diagram of an exemplary system architecture in which embodiments of the invention may be employed.

Turning now to FIG. 2, a block diagram is provided illustrating an exemplary system 200 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a number of social networking services 202A, 202B, 202N, a social data aggregator 204, and an event relationship module 206. It should be understood that the system 200 shown in FIG. 2 is an example of one suitable computing system architecture. Each of the components shown in FIG. 2 may be implemented via any type of computing device, such as computing device 200 described with reference to FIG. 2, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of social networking services, social data aggregators, and social analysis tools may be employed within the system 200 within the scope of the present invention. Each may comprise a single device or multiple devices cooperating in a distributed environment. For instance, the event relationship module 206 may be provided via multiple devices arranged in a distributed environment that collectively provide the functionality described herein. Additionally, other components not shown may also be included within the network environment.

The event relationship module 206 may be employed by search engine technologies in conjunction with, by way of example only, personal assistant/advisor applications. Among other things, the event relationship module 206 operates to collect social data from social networking services 202A, 202B, 202N. As represented in FIG. 2, social data may be collected from any number of social networking services. These services generally include any online presence at which users may share messages with other users within a social network of users. In some instances, the event relationship module 206 may access social data directly from a social networking service or an entity providing the event relationship module 206 may access the data from a social networking service and provide the data to the module 206. For instance, a social networking service may provide APIs that expose the data. In other instances, the event relationship module 206 may access social data from a third-party social data aggregator 204, which may operate to access data from one or more social networking services, standardize the data, and provide the standardized data. Any and all such variations are contemplated to be within the scope of embodiments of the present invention.

As shown in FIG. 2, the event relationship module 206 may include, among other things not shown, a timeline extraction component 210 and an analysis component 212. The timeline extraction component may include an experiential message identification component 214, a timestamp identification component 216, an event extraction component 218, and a valence identification component 220. The analysis component 212 may also include a causality analysis component 222. In some cases, an input query 224, corresponding to an action, event, or item of particular interest, may be communicated to the analysis component 212 for processing, as will be described.

The social data communicated to the event relationship module 206 may include a corpus of social media messages or "posts" (i.e., messages comprising original microblog texts posted by individuals). Such messages are comprised of original text communications posted by individuals. In some instances, the messages may comprise unstructured text data, typically seen with original text communications as described. In some other instances, the messages may comprise structured data. For example, a fitness tracker may automatically post, for a user, a non-textual structured representation of an exercise and data associated therewith. In another example, a music streaming service may post, for the user, a structured representation of a song that the user is currently listening to. Such structured representations may avoid simple textual descriptions of an activity, and instead use some predetermined representation that describes the key facets of a user action without specifying how these facets should be combined for presentation to other users. In some embodiments, messages may generally include a combination of simple textual representations in addition to structured representations. In some other embodiments, these messages may also include at least a user identifier and a timestamp, but may also include other metadata (e.g., location information, biographical information, popularity statistics, social network connections, etc.).

The event relationship module 206 performs an analysis on the corpus of messages using the timeline extraction component 210. The timeline extraction component 210 analyzes the corpus of social media messages to generate a set of timelines of event occurrences. Each timeline in the set comprises a timeline of events occurring in a single individual's life (i.e., a social media user). In some instances, the events may include actions explicitly taken by the individual. In other instances, the events may describe outcomes that occurred as a consequence of a particular action, or even background events that occur as a result of unrelated causes. The events, as described, may be directly extracted from each individual social media message, or inferred from the corpus as a whole.

In more detail, the timeline extraction component 210 may include subcomponents for facilitating event timeline extraction. The experiential message identification component 214, for example, may be utilized for identifying experiential messages that describe personal experiences of the author (i.e., the social media user), whether written by the author in past, current or (expected) future form. Social messages may include an amount of social "noise," including conversational texts, hearsay, pointers to news articles and current events, among others. The experiential message identification component 214 is configured to distinguish experiential messages from other social media content using a machine learning technique implementing any learning technology including, by way of example only, linear regressions, support vector machines, and/or deep neural networks.

The timeline extraction component 210 may further include a timestamp identification component 216 for identifying a time period referred to in an experiential message, or a time period inferred from a plurality of experiential messages. In essence, while many social media messages provide in situ reports of an individual's experiences, it is not uncommon for authors to also report on past and/or anticipated experiences. As such, the timestamp identification component 216 analyzes experiential messages using a rule-based system that can recognize and resolve basic expressions of relative offsets (i.e., "yesterday" or "next weekend"), as well as references to nearby days and dates (i.e., "Tuesday" and "February $10^{th}$"). By way of example only, an experiential message that recites "I can't believe my marathon is coming up in two days," can be interpreted by the timestamp identification component 216 as an event described in the experiential message (e.g., the "marathon") to occur two days after the timestamp stored within metadata of the message.

The timeline extraction component 210 may further include an event extraction component 218 for the recognition and canonicalization of events (i.e., identifying both actions and outcomes). In more detail, to facilitate the generation of a timeline of "events" from the timeline of messages, the timeline extraction component 210 identifies and extracts events from the social media message text. These events may be extracted directly from the textual representation of a message, or inferred from a plurality of messages. The task of extracting such events may be analogous to the task of named entity recognition, while sharing many of its challenges (i.e., including candidate identification, disambiguation, and canonicalization) as one skilled in the art may appreciate. In one embodiment, all phrases of the message are extracted as potential events, without attempting to classify them as actions, outcomes, or neither. Statistical phrase segmentation is used to identify candidates, while distribution of context is utilized as a comparison to identify canonicalization.

In some embodiments, a statistical modeling approach is utilized by the timeline extraction component 210 to infer hidden phrase boundaries in a text for phrase segmentation. To efficiently locate phrases, a phrase unigram language model is utilized. Briefly, each token in a phrase unigram language model includes one or more white-space separated words. By encoding multiple words within a single unigram, the phrase language model is able to capture long distance relationships without requiring high Markov order statistics and concomitant large models. The phrase unigram language model itself is trained from a large corpus of text using an expectation-maximization (EM) process that iteratively segments a corpus into likely phrases and then retrains a new phrase unigram language model. As one skilled in the art may appreciate, provided a phrase unigram language model, identifying phrase segmentations in a message is a matter of searching for the most probable combination of component unigrams. To facilitate canonicalization, some embodiments may build a distribution of single-word token probabilities based on the co-occurrences of single-word tokens that co-occur with each of the segmented phrases. Agglomerative hierarchical clustering may be utilized to group together all tokens that are within a distance threshold of one another, where the distances between two tokens is measured as the cosine similarity between the two feature vectors.

The timeline extraction component 210 may further include a valence identification component 220 for identifying whether an event is associated to a positive or negative valence. In other words, the valence identification component 220 may be operable to detect moods or sentiments associated with words in social media messages. Detection of these moods or sentiments and associating them with outcomes may help with reasoning about their significance. In some embodiments, a domain-agnostic affect extractor may be utilized to extract the author's levels of associated emotions to an event (e.g., joviality, sadness, fatigue, hostility, etc.).

The analysis component 212 receives, as briefly described above, an input query 224 for processing. The input query 224 may be defined by two events, a first event (E+) and a second event (E−). The causality analysis component 222 may be configured to identify the precedent and subsequent relationships of an event E+ that distinguish the social media timelines containing E+ from timelines comparing some event E−. Semantically, E+ and E− may be thought of as identifying either positive and negative outcomes, or control and treatment classes. The query 224, defined as two classes of events, E+ and E−, is used to identify and align two sets of timelines received from timeline extraction component 210. A class of events E is specified as, for example, some specific observation, or a complex matching function. As will be further described herein, different forms of high-level questions may be analyzed via analysis component 212 depending on the specific query chosen. For example, if a query is chosen such that E+ selects the performance of some specific action (and E− selects the non-performance of that action), then the results generated by analysis component 212 will identify what is likely to happen after taking the specified action. On the other hand, if a query is chosen such that E+ selects the achievement of a specific goal (and E− selects the non-achievement of that goal), then the precedents identified by analysis component 212 will identify what is likely done and differentiates between people achieving the goal and not achieving the goal. In some embodiments, regardless of the specification of E+ or E−, in either the context of a goal or action, both precedent and subsequent events may be calculated. As such, precedent events leading to taking a specific action may be analyzed, as well as subsequent events following from having achieved a specific goal.

The causality analysis component 222 may identify the distinguishing precedent and subsequent events when comparing timelines containing an event E+ to those containing an event E−. In one embodiment, the events may be identified using a simple correlational analysis while, in another embodiment, the events may be identified using a correlational analysis with semantic restrictions. In a first example, simple correlations are determined between a target event and the events that precede or follow it. The goal is to find events that are more correlated with occurring before or after E+ (but not both before and after) than occurring before or after E−. In another example, semantic correlations add restrictions that only consider those events that are believed to be semantically closely related to the domain of interest. Semantic correlation makes an assumption that if an event of interest is related to target events E+ and E−, then at least one person would have clearly mentioned the event of interest in the recognizable context of the target domain. As such, the ranked events of interest should be more robust to noise and confounds and, although the query model is extended to include a specification of a domain of interest, it is expected that events found to be correlated are more likely to be easily interpretable by humans.

Figure 3:
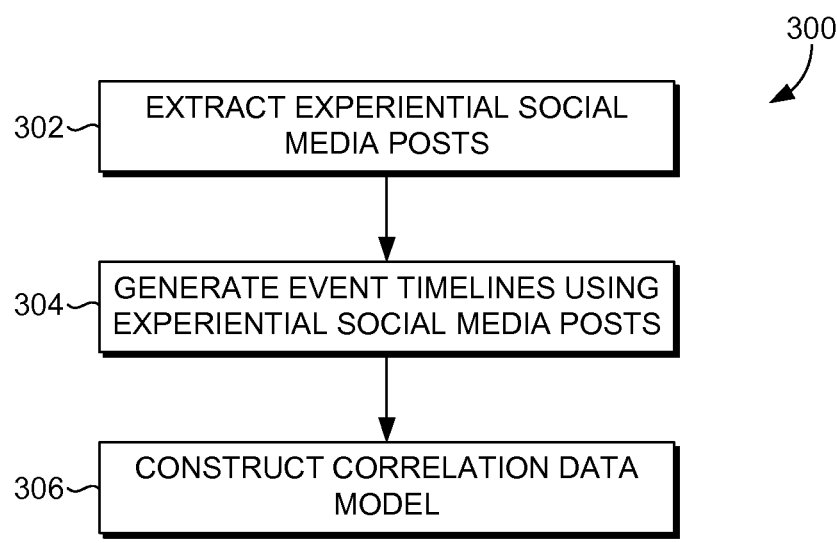
FIG. 3 is a flow diagram showing a method for analyzing a large amount of social media data from a large population of social media users and constructing correlational data models between one or more events that occur within each user's timelines.

Turning now to FIG. 3, a flow diagram is provided that illustrates a method 300 for analyzing a large amount of social media data from a large population of social media users and constructing correlational data models between one or more events that occur within each user's timeline. Each block of the method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

As shown at block 302, a plurality of experiential social media posts associated to a plurality of social media users are extracted (for instance, by the timeline extraction component 210 of FIG. 2). The experiential social media posts are identified and extracted, as described herein, from a plurality of uncategorized social media posts received, for instance, by social data aggregator 204 of FIG. 2. Each social media post, regardless of type or categorization, may include metadata that includes a variety of information about the post and/or authoring user, such as authoring user's name or username, geographic location, and timestamp of the post submission, among other things.

An experiential social media post is defined as a social media post that includes content that communicates an authoring user's first person experience. In order to identify experiential social media posts among a plurality of uncategorized social media posts, methods using various machine learning techniques may be utilized. In some embodiments, simple statistical language modeling may be used to identify experiential social media posts from uncategorized social media posts. Statistical language modeling may include a broad spectrum of machine learning techniques ranging from simple learning algorithms, such as linear regressions, to more complex processes, such as support vector machines (SVMs) and deep neural networks. The foregoing are merely examples of machine learning techniques and are not intended to be limiting in scope, as any machine learning technique for implementing statistical language modeling may be considered within the scope of the present invention.

A plurality of event timelines are generated (for instance, by timeline extraction component 210 of FIG. 2), as shown at block 304. An event timeline is generated for each unique user, such that each of the plurality of social media users is associated with a unique event timeline. Event timelines may include a timeline of events for each unique individual, wherein the events are described using experiential social media posts by the individual user. The event timelines may be generated based on, among other things, the metadata of each experiential social media post. In some embodiments, when an experiential social media post includes a temporal description of an event, the experiential social media post placement on the event timeline may be adjusted to align with the described temporal description (for instance, using timestamp identification component 216 of FIG. 2). Event timelines may also be generated based on a combination of social media data and other non-personal data sources. For example, if someone says, in a post, that they ate a hamburger and fries, some embodiments may seek and retrieve nutritional information from the government and/or nutritional resource and create an "ate an unhealthy meal" event and/or specifically add nutritional information into the event itself. In another example, if someone posts that they were at a particular location on a particular day, some embodiments may add contextual information about the location. For example, if someone posts that they "jogged in Seattle today," embodiments may seek and retrieve weather information for the location and day to add context to the post that the author "jogged in the rain."

In some embodiments, the experiential social media posts may each be analyzed (for instance, by valence identification component 220) to identify a positive or negative valence of each experiential social media post. In some embodiments, valence may be identified by analyzing multiple social media posts in aggregation. For example, if someone posts "today was a great day," some embodiments may assign a positive valence to all events that occurred in that particular day in that person's timeline. Positive or negative valence may also be multi-dimensional. For example, someone may express that they are, to some degree, both happy and tired. This multi-faceted representation may yield more insights and more appropriately represent the complexity of an event than a single positive/negative value.

A correlational data model is constructed (for instance, by analysis component 212 of FIG. 2), as shown at block 306, by measuring correlations between a particular event of interest received (for example, through input query 224 of FIG. 2) and at least some of the plurality of experiential social media posts in at least some of the plurality of event timelines. For instance, events defined in an input query may also occur or be relevant to one or more posts found in none, some, or all of the plurality of event timelines. As such, the analysis component 212 may analyze the event timelines to determine whether the timelines include events that are relevant to the input query. The correlational data model may include models of the correlational analysis or causal analysis variety. Correlational analysis, such as Bayesian analysis, or more sophisticated techniques motivated to estimate causality, such as propensity score matching, structural equation modeling, granger causality, and path analysis, among others, may be considered for use as a correlational data model within the scope of the present invention. As such, the event timelines are analyzed to generate or construct a correlational data model that includes correlational measurements of any or all events that occur within the plurality of event timelines. In some embodiments, the correlational data model including correlational measurements can be generated on-the-fly upon receiving input queries, pre-generated and cached using a predetermined set of input queries, or generated and cached over time, such that each input query generates correlational measurements on-the-fly, which are cached or stored in memory immediately thereafter.

In some embodiments, the correlational data model can be made available as a service to the system or a $3^{rd}$ party system (not shown) for querying relationships between one or more particular events of interest. In further embodiments, a decision-making calculation may request, from the correlational data model, data including and/or all correlations between the event timelines and a particular event of interest having, for example, a magnitude above a particular threshold. As such, the correlational data model can be applied to the decision-making calculation corresponding to the particular event of interest, to ultimately provide correlational data for decision-making assistance. One of ordinary skill in the art may appreciate that correlational data provided between a particular event and a large sample of event data can deliver empirical support for decision-making in various applications. In some embodiments, the magnitude of correlational measurements may indicate strength and/or potential importance of a particular relationship. Causal relationships, in particular, may be inferred when all possible causal factors have been observed and one or more combinations of causal factors are observed to lead deterministically to some outcome. In some instances, when one or more combinations of causal factors probabilistically lead to a particular outcome, causal relationships may be established. As such, algorithms that perform causal analysis attempt to factor out all alternative explanations for the occurrence of a particular event. In essence, algorithms may determine whether a particular combination of factors will lead to a specific outcome, and whether the lack of that combination of factors otherwise lead to failure of the specific outcome. In some embodiments, algorithms for determining causal relationships attempt to determine, when all other events are substantially equal (thereby factoring out alternative explanations for the occurrence of a particular event), whether a causal relationship exists. In such instances, the event relationship module 206 may be operable to determine a causal relationship between the particular event of interest and various events in the event timelines, further utilizing such determinations for more active applications, as will be described.

Application of the correlational data model may be conducted by a system in an active or passive manner. When a particular event of interest is submitted or noted to be of importance in a particular application, an active application of the model can be designed to present alerts upon, for example, detecting timeline events having a threshold correlation being reached, or a causal relationship being established. In some embodiments, an active application of the data model may include a computing device or software application that autonomously takes a predefined action without the user's intervention. For instance, a software application may be operable to interrupt the user with an alert, automatically purchase tickets to and/or schedule events, or even actively prevent presentation of some alerts. In other instances, a passive application of the model can be designed to provide correlational data only when queried by a particular application or user. In embodiments, the correlational data model may further provide additional information with the correlational data used for facilitating interpretation of the correlational data. In such embodiments, the additional information may include content from the experiential social media posts having reached the threshold correlation.

Figure 4:
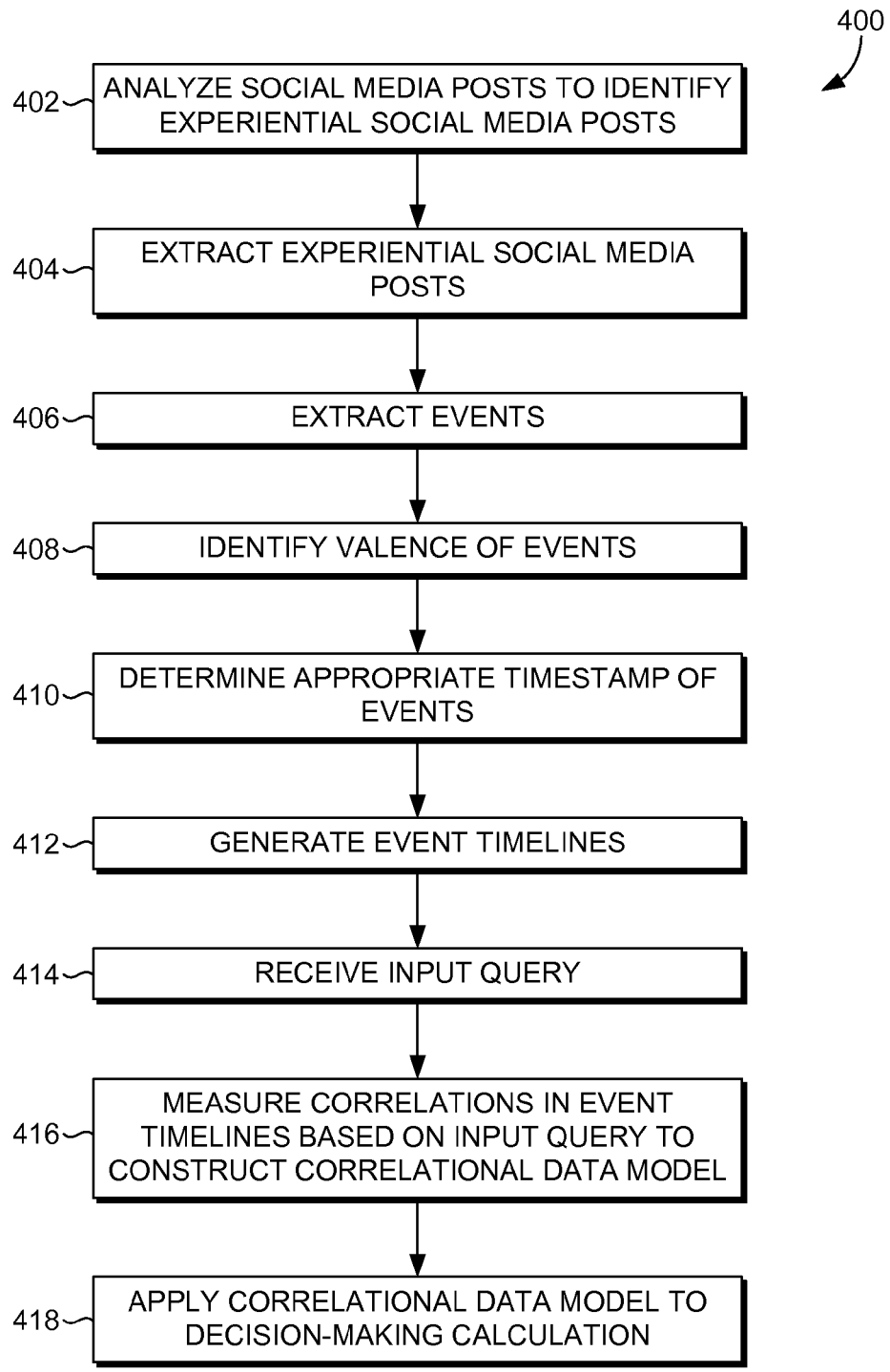
FIG. 4 is a flow diagram showing a method for analyzing a large amount of social media data from a large population of social media users and constructing correlational data models between one or more events that occur within each user's timelines.

Turning now to FIG. 4, a flow diagram is provided that illustrates a method 400 for analyzing a large amount of social media data from a large population of social media users and constructing correlational data models between one or more events that occur within each user's timeline. Initially, as shown at block 402, a plurality of social media posts are analyzed (for instance, using timeline extraction component 210 of FIG. 2) to identify experiential social media posts. The experiential social media posts are identified and extracted, as shown at block 404, as communicating a first-person experience of the author, as opposed to a non-experiential post. Identification of the experiential social media posts can be conducted by, for example, experiential message identification component 214 of FIG. 2. As shown at block 406, all experiential events are identified and extracted (for instance, using event extraction component 218 of FIG. 2) for each social media user having authored posts in the plurality of social media posts. Further, a positive or negative valence or mood of the events are determined (for instance, using valence identification component 220 of FIG. 2) for each event in the timelines, as shown at block 408. As shown at block 410, the timestamp of events are determined by analyzing, among other things, the metadata of each social media post from which the events were extracted and/or the content of the social media post from which the events were extracted (i.e., temporal descriptions).

Although the method 400 illustrates event extraction 406, valence identification 408, and determination of appropriate timestamps 410 in a sequential order, the foregoing events are not limited to a particular order and any order of the foregoing are considered within the scope of the present invention. Following the foregoing processes, an event timeline for each social media user responsible for authoring communications corresponding to the events is generated. As such, a plurality of event timelines is generated, each timeline being unique to a particular social media user.

After the event timelines are generated, they are subsequently analyzed according to a received input query, as shown at block 414, 416, and 418. More specifically, an input query is received (for instance, by analysis component 212 of FIG. 2) and analyzed in conjunction with the event timelines generated (for instance, by timeline extraction component 210 of FIG. 2). The analysis conducts a plurality of correlation measurements in the event timelines based on the input query, as shown at block 416. For example, the input query may include a particular event of interest, such as a specific action or goal. The analysis broadly identifies precedents and subsequent relationships to the particular event of interest that distinguishes the event timelines containing the particular event of interest from timelines comparing, for example, an inverse action, a null action of the particular event, or the non-achievement of a goal. As such, a set of timelines matching the particular event of interest may be extracted, in addition to a set of timelines that match the inverse, null, or non-achievement events, as described. The foregoing sets may provide a framework of generating a correlational data model for more flexibly querying the data. The correlational data model may be constructed (for instance, using analysis component 212 of FIG. 2). The data model is now operable to receive specific queries such as, by way of example only: (1) inquiring about a specific action to identify what is likely to happen after taking the specified action; or (2) inquiring about planning for a particular goal achievement to identify what is likely done and differentiates between people actually achieve the goal and not achieving it.

The correlational data model may be utilized by any component of the system 200 or made available as a service to a $3^{rd}$ party, as shown at block 418. The application of the correlational model may be considered in various use cases. By way of example only, electronic personal assistants, search engine technologies, social researchers, market researchers, product development, any application for which an inquiry is made regarding action/consequence relationships, and others, are considered within the scope of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. One or more computer-readable storage hardware devices storing computer-usable instructions that, when used by one or more computing devices, cause the one or more computing devices to perform operations comprising:
for each social media account of a plurality of social media accounts extracting, from at least a portion of a plurality of published social media posts that correspond to the social media account, a set of experiential phrases that are each identified based at least in part on phrase segments included in the portion of the corresponding plurality of published social media posts, wherein each identified experiential phrase in the extracted set of experiential phrases corresponds to one of the corresponding plurality of published social media posts,
assigning, to each identified experiential phrase in the extracted set of experiential phrases, one of a positive valence value or a negative valence value that is determined based at least in part on a detected sentiment term included in the corresponding published social media post, and
generating a corresponding event timeline that includes the extracted set of experiential phrases that is ordered based on timestamps associated with the portion of corresponding published social media posts;
generating a correlational data model based at least in part on a first experiential phrase that is determined common among a first portion of the generated event timelines and at least a second experiential phrase that is determined common among the first portion of the generated event timelines; and
responsive to a received query that describes one of a positive characterization and a negative characterization of an event that corresponds to the first experiential phrase, providing a corresponding characterization of the second experiential phrase as a response to the received query based on a determination that the second experiential phrase has a highest-measured correlational strength to the first experiential phrase in accordance with the generated correlational data model.

2. The one or more computer-readable hardware storage devices of claim 1, wherein an experiential phrase includes one or more terms that are determined to reference a first-person experience.

3. The one or more computer-readable hardware storage devices of claim 1, wherein a correlational strength is measured based at least in part on a number of times an experiential phrase is determined to co-occur with another experiential phrase.

4. The one or more computer-readable hardware storage devices of claim 1, wherein an experiential phrase is determined common among a portion of the generated event timelines based at least in part on a determination that each event timeline in the portion of the generated event timelines includes one or more published social media posts that reference the experiential phrase.

5. A computer-implemented method comprising:
obtaining, by a server device, social media posts published by a plurality of social media accounts, wherein each social media account in the plurality of social media accounts is associated with a corresponding plurality of social media posts;
for each social media account in the plurality of social media user accounts
extracting, by the server device, a set of experiential phrases from the corresponding plurality of social media posts, wherein each experiential phrase in the set of experiential phrases is identified based at least in part on one or more experiential terms included in a corresponding social media post from the corresponding plurality of social media posts,
assigning, by the server device, to each experiential phrase in the extracted set of experiential phrases, one of a positive valence value or a negative valence value that is determined based at least in part on a detected sentiment term included in the corresponding social media post, and
generating, by the server device, a corresponding event timeline that includes the extracted set of experiential phrases that is ordered based on timestamps associated with the corresponding plurality of social media posts;
generating, by the server device, a correlational data model based at least in part on a first experiential phrase that is determined common among a first portion of the generated event timelines and at least a second experiential phrase that is determined common among the first portion of the generated event timelines; and
responsive to a query received from a client device, the query describing one of a positive characterization or a negative characterization of an event that corresponds to the first experiential phrase, providing by the server device, a corresponding characterization of the second experiential phrase as a response to the received query based on a determination that the second experiential phrase has a highest-measured correlational strength to the first experiential phrase in accordance with the generated correlational data model.

6. The computer-implemented method of claim 5, wherein an experiential phrase includes one or more terms determined to reference a first-person experience.

7. The computer-implemented method of claim 5, wherein a correlational strength is measured based at least in part on a number of times an experiential phrase is determined to co-occur with another experiential phrase.

8. A computerized system comprising:
one or more processors; and
one or more computer storage media storing computer-useable instructions that, when used by the one or more processors, cause the one or more processors to:
obtain a plurality of event timelines that each corresponds to one of a plurality of social media user accounts, wherein each event timeline of the obtained plurality of event timelines includes a corresponding plurality of social media posts;
for each social media account of a plurality of social media accounts
extract, from at least a portion of a plurality of published social media posts that correspond to the social media account, a set of experiential phrases that are each identified based at least in part on phrase segments included in the portion of the corresponding plurality of published social media posts, wherein each identified experiential phrase in the extracted set of experiential phrases corresponds to one of the corresponding plurality of published social media posts,
assign, to each identified experiential phrase in the extracted set of experiential phrases, one of a positive valence value or a negative valence value that is determined based at least in part on a detected sentiment term included in the corresponding published social media post, and
generate a corresponding event timeline that includes the extracted set of experiential phrases that is ordered based on timestamps associated with the portion of corresponding published social media posts;
generate a correlational data model based at least in part on a first experiential phrase that is determined common among a first portion of the generated event timelines and at least a second experiential phrase that is determined common among the first portion of the generated event timelines; and
responsive to a received query that describes one of a positive characterization and a negative characterization of an event that corresponds to the first experiential phrase, determine that the second experiential phrase has a highest-measured correlational strength to the first experiential phrase in accordance with the generated correlational data model, to provide a corresponding characterization of the second experiential phrase.

9. The computerized system of claim 8, wherein an experiential phrase is determined common among a portion of the generated event timelines based at least in part on a determination that each event timeline in the portion of the generated event timelines includes one or more published social media posts that reference the experiential phrase.

10. The computerized system of claim 8, wherein a correlational strength is measured based at least in part on a number of times an experiential phrase is determined to co-occur with another experiential phrase.

\* \* \* \* \*